United States Patent
Donnelly et al.

(10) Patent No.: US 9,362,546 B1
(45) Date of Patent: Jun. 7, 2016

(54) THIN FILM LITHIUM CONDUCTING POWDER MATERIAL DEPOSITION FROM FLUX

(71) Applicant: QuantumScape Corporation, San Jose, CA (US)

(72) Inventors: Niall Donnelly, Roseville, MN (US); Tim Holme, Mountain View, CA (US)

(73) Assignee: QuantumScape Corporation, San Jose, CA (US)

( * ) Notice: Subject to any disclaimer, the term of this patent is extended or adjusted under 35 U.S.C. 154(b) by 240 days.

(21) Appl. No.: 14/146,728

(22) Filed: Jan. 3, 2014

Related U.S. Application Data

(60) Provisional application No. 61/749,496, filed on Jan. 7, 2013.

(51) Int. Cl.
  *B05D 5/12* (2006.01)
  *H01M 4/04* (2006.01)

(52) U.S. Cl.
  CPC .......... *H01M 4/0404* (2013.01); *H01M 4/0433* (2013.01)

(58) Field of Classification Search
  None
  See application file for complete search history.

(56) References Cited

U.S. PATENT DOCUMENTS

| | | | |
|---|---|---|---|
| 6,277,524 B1 | 8/2001 | Kanno | |
| 6,306,535 B1 * | 10/2001 | Tomimatsu | H01M 8/142 429/475 |
| 7,901,658 B2 | 3/2011 | Weppner et al. | |
| 8,092,941 B2 | 1/2012 | Weppner et al. | |
| 8,268,488 B2 | 9/2012 | Neudecker | |
| 8,283,843 B2 | 10/2012 | Pan et al. | |
| 8,658,317 B2 | 2/2014 | Weppner et al. | |
| 8,697,292 B2 | 4/2014 | Kanno et al. | |
| 8,877,388 B1 | 11/2014 | Ihlefeld et al. | |
| 2005/0016839 A1 * | 1/2005 | Horne | C23C 16/403 204/242 |
| 2007/0015061 A1 | 1/2007 | Klaassen | |
| 2009/0226790 A1 | 9/2009 | Kanamura | |
| 2009/0301769 A1 | 12/2009 | Seppa et al. | |
| 2010/0047696 A1 | 2/2010 | Yoshida | |
| 2010/0203383 A1 | 8/2010 | Weppner | |
| 2011/0053000 A1 | 3/2011 | Kanamura | |
| 2011/0053002 A1 | 3/2011 | Yamamura | |
| 2012/0196189 A1 | 8/2012 | Babic et al. | |

(Continued)

FOREIGN PATENT DOCUMENTS

| JP | 2013/134852 A | 7/2013 |
|---|---|---|
| JP | 2013/214421 A | 10/2013 |

OTHER PUBLICATIONS

Buschmann, Henrik, et al., "Structure and dynamics of the fast lithium ion conductor :$Li_7La_3Zr_2O_{12}$," Phys. Chem. Chem. Phys., 2011, vol. 13, pp. 19378-19392.

(Continued)

*Primary Examiner* — Austin Murata
(74) *Attorney, Agent, or Firm* — Squire Patton Boggs (US) LLP

(57) ABSTRACT

The present invention is directed to battery technologies and processing techniques thereof. In various embodiments, ceramic electrolyte powder material (or component thereof) is mixed with two or more flux to form a fluxed powder material. The fluxed powder material is shaped and heated again at a temperature less than 1100° C. to form a dense lithium conducting material. There are other variations and embodiments as well.

21 Claims, 7 Drawing Sheets

(56) References Cited

U.S. PATENT DOCUMENTS

| | | | |
|---|---|---|---|
| 2012/0237834 | A1 | 9/2012 | Ogasa |
| 2013/0085055 | A1 | 4/2013 | Raj et al. |
| 2013/0281175 | A1 | 10/2013 | MacDonald et al. |
| 2014/0072870 | A1 | 3/2014 | Otsuka |
| 2014/0093785 | A1 | 4/2014 | Sugiura et al. |
| 2014/0170504 | A1 | 6/2014 | Baek et al. |
| 2014/0193695 | A1 | 7/2014 | Hoshina |
| 2014/0377665 | A1 | 12/2014 | Yoshida |

OTHER PUBLICATIONS

Kotobuki, Masashi, et al., "Fabrication of all-solid-state lithium battery with lithium metal anode using $Al_2O_3$-added $Li_2La_3Zr_2O_{12}$ solid electrolyte," Journal of Power Sources, 2011, vol. 196, pp. 7750-7754.

Miyauchi, Katsuki, et al., "New Amorphous Thin Films of Lithium Ion Conductive Solid Electrolyte," Solid State Ionics 9 & 10, 1983, pp. 1469-1472.

Geiger, Charles, A., et al., "Crystal Chemistry and Stability of "$Li_7La_3Zr_2O_{12}$" Garnet: A Fast Lithium-Ion Conductor," Inorganic Chemistry, 2011, vol. 50, pp. 1089-1097.

Murugan, Ramaswamy, et al., "Fast Lithium Ion Conduction in Garnet-Type $Li_7La_3Zr_2O_{12}$," Angew. Chem. Int. Ed., 2007, vol. 46, pp. 7778-7781.

Li, Yutao, et al., "Optimizing Li conductivity in a garnet framework," J. Mater. Chem., 2012, vol. 22, pp. 15357-15361.

Ohta, Shingo, et al., "High lithium ionic conductivity in the garnet-type oxide $L1_{7-x}La_3(ZR_{2-x}, Nb_x)O_{12}(X=0-2)$," Journal of Power Sources, 2011, vol. 196, pp. 3342-3345.

Thangadurai, Venkataraman, et al., "$Li_6ALa_2Nb_2O_{12}$ (A=Ca, Sr, Ba): A New Class of Fast Lithium Ion Conductors with Garnet-Like Structure," J. Am. Ceram. Soc., 2005, vol. 88, No. 2, pp. 411-418.

Mizuno, Yusuke, et al., "Environmentally Friendly Flux Growth of High-Quality, Idiomorphic $Li_5La_3Nb_2O_{12}$ Crystals," Crystal Growth & Design, Dec. 11, 2012, 24 pages.

Raskovalov, A. A., et al, "Structure and transport properties of $L1_7La_3Zr_{2-0.75x}Al_xO_{12}$ supersonic solid electrolytes," Journal of Power Sources, 2013, vol. 238, pp. 48-52.

Ohta, Shingo, et al., "All-solid-state lithium ion battery using garnet-type oxide and $Li_3BO_3$ solid electrolytes fabricated by screen printing," Journal of Power Sources, 2013, pp. 53-56.

Tadanaga, Kiyoharu, et al., "Low temperature synthesis of highly ion conductive $Li_7La_3Zr_2O_{12}$-$Li_3BO_3$ composites," Electrochemistry Communications, 2013, vol. 33, pp. 51-54.

Ni, Jennifer, et al., "Room temperature elastic moduli and Vickers hardness of hot-pressed LLZO cubic garnet," J. Mater. Sci., 2012, vol. 47, pp. 7979-7985.

Shimonishi, Yuta, et al., "Synthesis of garnet-type $Li_{7-x}La_3Zr_2O_{12-1/2x}$ and its stability in aqueous solutions," Solid State Ionics, 2011, vol. 183, pp. 48-53.

Kokal, I., et al., "Sol-gel synthesis and lithium ion conductivity of $Li_7La_3Zr_2O_{12}$ with garnet-related type structure," Solid State Ionics, 2011, vol. 185, pp. 42-46.

Matsui, Masaki, et al., "Phase transformation of the garnet structured lithium ion conductor: $Li_7La_3Zr_2O_{12}$," Solid State Ionics, 2013, 5 pages, http://dx.doi.org/10.1016/j.ssi.2013.09.027.

Ishiguro, K., et al., "Stability of Nb-Doped Cubic $Li_7La_3Zr_2O_{12}$ with Lithium Metal," Journal of the Electrochemical Society, 2013, vol. 160, No. 10, A1690-A1693.

Dhivya, L., et al., "$Li^{30}$ transport properties of W substituted $Li_7La_3Zr_2O_{12}$ cubic lithium garnets," AIP Advances, 2013, vol. 3, 22 pages.

Cheng, Lei, et al., "Effect of microstructure and surface impurity segregation on the electrical and electrochemical properties of dense Al-substituted $Li_7La_3Zr_2O_{12}$," J. Mater. Chem., 2014, 10 pages.

Hyooma, H., et al., "Crystal Structures of $La_3Li_5M_2O_{12}$ $^{(M=Nb, Ta)}$," Mat. Res. Bull., 1988, vol. 23, pp. 1399-1407.

Hayashi, K., et al., "New Phases in $La_2O_3$—$Li_2O$—$Ta_2O_5$ System," Mat. Res. Bull., 1986, vol. 21, pp. 289-293.

Takeda, Y., et al., "High Pressure Form of Fluoride Garnets $Na_3M_2Li_3F_{12}$ $^{(M=Al\ \&\ Fe)}$," Mat. Res. Bull., 1977, vol. 12, pp. 689-692.

Jin, Ying, et al., "Al-doped $Li_7La_3Zr_2O_{12}$ synthesized by a polymerized complex method," Journal of Power Sources, 2011, vol. 196, pp. 8683-8687.

Nyman, May, et al., "Alternative Approach to Increasing Li Mobility in Li—La—Nb/Ta Garnet Electrolytes," 2010, Chem. Mater., vol. 22, pp. 5401-5410.

Thangadurai, Venkataraman, et al., "Novel Fast Lithium Ion Conduction in Garnet-Type $Li_5La_3M_2O_{12}$ (M=NB, Ta)," J. Am. Ceram. Soc., 2003, vol. 86, No. 3, pp. 437-440.

Kotobuki, Masashi, et al., "Compatibility of $Li_7La_3Zr_2O_{12}$ Solid Electrolyte to All-Solid-State Battery Using Li Metal Anode," Journal of the Electrochemical Society, 2010, vol. 157, No. 10, pp. A1076-A1079.

Cheng, Lei, et al., "The origin of high electrolyte-electrode interfacial resistances in lithium cells containing garnet type solid electrolytes," Phys. Chem. Chem. Phys., 2014, 7 pages.

Kokal, I., et al., Accepted Manuscript dated Aug. 28, 2014 entitled "Preparation and characterization of three dimensionally ordered macroporous $Li_5La_3Ta_2O_{12}$ by colloidal crystal templating for all-solid-state lithium-ion batteries," to appear in Ceramics International, 2014, 17 pages.

Ahn, Jee Hyun, et al., Accepted Manuscript dated Dec. 27, 2013 entitled "Local impedance spectroscopic and microstructural analyses of Al-in-diffused $Li_7La_3Zr_2O_{12}$," to appear in Journal of Power Sources, 2014, 27 pages.

Toda, S., et al., "Low temperature cubic garnet-type $CO_2$-doped $Li_7La_3Zr_2O_{12}$," Solid State Ionics, 2013, vol. 233, pp. 102-106.

Teng, Shiang, et al., "Recent Developments in garnet based solid state electrolytes for thin film batteries," Current Opinion in Solid State and Materials Science, Oct. 30, 2013, 10 pages. http://dx.doi.org/10.1016/j.cossms.2013.10.002.

Sudo, R., et al., "Interface behavior between garnet-type lithium-conducting solid electrolyte and lithium metal," Solid State Ionics, 2013, 4 pages, http://dx.doi.org/10.1016/j.ssi.2013.90.024.

Matsui, M., et al., "Phase stability of a garnet-type lithium ion conductor $Li_7La_3Zr_2O_{12}$," The Royal Society of Chemistry, Dalton Translations, 2013, 6 pages.

Wang, X. P., et al., Accepted Manuscript "Correlation and mechanism of lithium ion diffusion with crystal structure in $Li_7La_3Zr_2O_{12}$ revealed by internal friction technique," 2014, Phys. Chem. Chem. Phys., 27 pages.

Rettenwander, Daniel, et al., Accepted Manuscript dated Mar. 19, 2014 "A DFT study of the role of $Al^{3+}$ in the fast ion-conductor $Li_{7-3x}Al^{3+}_xLa_3Zr_2O_{12}$ garnet," Chemistry of Materials, 2014, 14 pages.

Reinacher, Jochen, et al., "Preparation an electrical properties of garnet-type $Li_6BaLa_2Ta_2O_{12}$ lithium solid electrolyte thin films prepared by pulsed laser deposition," Solid State Ionics, 2014, vol. 258, 7 pages.

Rangasamy, E., et al., Accepted Manuscript A High Conducting Oxide—Sulfide Composite Lithium Superionic Conductor,: Journal of Materials Chemistry A, 2014, 7 pages.

Lee, Jae-Myung, et al., "High lithium ion conductivity of $Li_7La_3Zr_2O_{12}$ synthesized by solid state reaction," Solid State Ionics, 2014, vol. 258, pp. 13-17.

Onodera, H., et al., "Flux Growth of Idiomorphic Garnet-Type Solid Electrolyte Crystals for All-Solid-State Lithium-Ion Rechargeable Batteries," 2012, The Electrochemical Society, Abstract #1198, 1 page.

Rangasamy, E., et al., "The effect of 24c-site (A) cation substitution on the tetragonal-cubic phase transition in $Li_{7-x}La_{3-x}A_xZr_2O_{12}$ garnet-based ceramic electrolyte," Journal of Power Sources, 2013, vol. 230, pp. 261-266.

Rangasamy, E., et al., "The role of Al and Li concentration on the formation of cubic garnet solid electrolyte of nominal composition $Li_7La_3Zr_2O_{12}$," Solid State Ionics, 2012, vol. 206, pp. 28-32.

Han, Jiantao, et a., "Experimental visualization of lithium conduction pathways in garnet-type $Li_7La_3Zr_2O_{12}$," Chem. Commun., 2012, vol. 48, pp. 9840-9842.

(56) References Cited

OTHER PUBLICATIONS

Sakamoto, Jeff, "Garnet-based ceramic electrolyte: Enabling Li metal anodes and solid state batteries," Beyond Lithium Ion VI, Jun. 4-6, 2013, Boulder, CO., 36 pages.

Xie, Hui, et al., "Low-temperature synthesis of $Li_7La_3Zr_2O_{12}$ with cubic garnet-type structure," Materials Research Bulletin, 2012, vol. 47, pp. 1229-1232.

Düvel, Andre, et al., "Mechanosynthesis of Solid Electrolytes: Preparation, Characterization, and Li Ion Transport Properties of Garnet-Type Al-Doped $Li_7La_3Zr_2O_{12}$ Crystallizing with Cubic Symmetry," The Journal of Physical Chemistry, 2012, vol. 116, pp. 15192-15202.

Goodenough, John, B., "Solid Electrolytes for Next Generation Batteries," Texas Materials Institute, The University of Texas at Austin, May 14-18, 2012, DOE Vehicle Technologies Annual Merit Review Meeting, 18 pages.

Bonderer, et al., "Free-Standing Ultrathin Ceramic Foils," Journal fo the Americal Ceramic Society (Impact Facto: 2.11), Nov. 2010; 93(11):2514-3631.

Buschmann, Henrik, et al., "Lithium metal electrode kinetics and ionic conductivity of the solid lithium ion conductors '$Li_7La_3Zr_2O_{12}$·and $Li_{7-x}La_3Zr_{2-x}Ta_xO_{12}$ with garnet-type structure," Journal of Power Sources, May 15, 2012, vol. 206, pp. 236-244.

Zhang, Yanhua, et al., "Field assisted sintering of dense Al-substituted cubic phase $Li_7La_3Zr_2O_{12}$ solid electrolytes," Journal of Power Sources, 2014, vol. 268, pp. 960-964.

International Search Report and Written Opinion mailed Mar. 10, 2015 in PCT/US2014/059578, 16 pages.

International Search Report and Written Opinion mailed Mar. 23, 2015 in PCT/US2014/059575, 18 pages.

Office Action mailed May 8, 2015 in U.S. Appl. No. 14/531,929, 12 pages.

\* cited by examiner

THIN FILM LITHIUM CONDUCTING POWDER MATERIAL DEPOSITION FROM FLUX

CROSS-REFERENCES TO RELATED APPLICATIONS

This application claims priority to U.S. Provisional Patent Application No. 61/749,496, filed 7 Jan. 2013, entitled "THIN FILM LITHIUM CONDUCTING POWDER MATERIAL DEPOSITION FROM FLUX", which in incorporated by reference herein for all purposes.

STATEMENT AS TO RIGHTS TO INVENTIONS MADE UNDER FEDERALLY SPONSORED RESEARCH AND DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention is directed to battery technologies and processing techniques thereof.

In the recent years, with shortage of fossil-fuel based energy and adverse environmental effects from the consumption of fossil fuels, both public and private sectors have poured much valuable resources into clean technologies. An important aspect of clean technologies is energy storage, and in particular, battery systems. In the past, many battery types have been developed and used, each with their respective advantages and disadvantages. For its chemical properties, including high charge density, lithium based batteries have become the leading battery technology for mobile energy storage applications. In a rechargeable lithium-ion battery, lithium ions move from the negative electrode to the positive electrode during discharge through a liquid electrolyte. For safety reasons in various applications, it is desirable to replace the liquid component and develop an all solid state lithium ion battery. All solid state lithium ion batteries would have many applications in the clean technology sector, such as battery system for electric cars, energy storage for solar cells, and many others.

Unfortunately, contemporary battery systems have been inadequate and high volume manufacturing processes for solid state batteries are not well developed. Therefore, it is desirable to have new battery systems and develop new techniques for manufacturing of batteries.

BRIEF SUMMARY OF THE INVENTION

The present invention is directed to battery technologies and processing techniques thereof. In various embodiments, ceramic electrolyte powder material (or component thereof) is mixed with two or more flux materials at a temperature of less than 400° C. to form a fluxed powder material. The fluxed powder material is shaped and heated again at a temperature less than 1100° C. to form a dense lithium conducting material. There are other variations and embodiments as well.

According to an embodiment, the present invention provides a method for depositing lithium conducting electrolyte materials including those with the garnet, perovskite, NASICON and LISICON structures. The method includes providing a lithium conducting ceramic powder material at a first quantity. The ceramic powder material is characterized by a first density. The lithium conducting ceramic powder material has a median particle size of about 100 nm to 10 um. The method also includes providing a first flux material at a second quantity, which is less than 51% of the first quantity. The first flux material comprises lithium material. The first flux material has a melting temperature of about 500-1000° C. The method also includes providing a second flux material at a third quantity. The second flux material is characterized by a melting temperature of about 500-1000° C. The method further comprises mixing at least the first flux material and the second flux material to form a eutectic mixture, which is characterized by a melting point of less than 1000° C. The method also includes subjecting the eutectic mixture a temperature of about 100 to 1000° C. Additionally, the method further includes mixing the eutectic mixture with the ceramic powder material to form a fluxed ceramic powder material. The method additionally includes shaping the fluxed ceramic powder material to a predetermined shape. The method also includes heating the shaped fluxed ceramic powder material to a temperature of less than 1100° C. Moreover, the method includes forming a dense lithium conducting material, the dense lithium conducting material being characterized by a second density, the second density is at least 80% of the theoretical crystalline density of the material.

It is to be appreciated that embodiments of the present invention provides numerous advantages over conventional techniques. The solid electrolyte is manufactured at a relatively low (compared to existing techniques) temperature and may be deposited upon a substrate. The low temperature growth and/or deposition translate to low manufacturing cost and high efficiency. In addition, since the solid electrolyte material can be deposited as a thin film onto current structure elements of batteries, the solid electrolyte manufacturing according to embodiments of the present invention can be readily and conveniently incorporated into battery cell designs. In addition, solid electrolytes according to embodiments of the present invention can have high stability to water, air, lithium metal anodes, and with cathode potentials of greater than 5V.

DETAILED DESCRIPTION OF THE INVENTION

Figure 1:
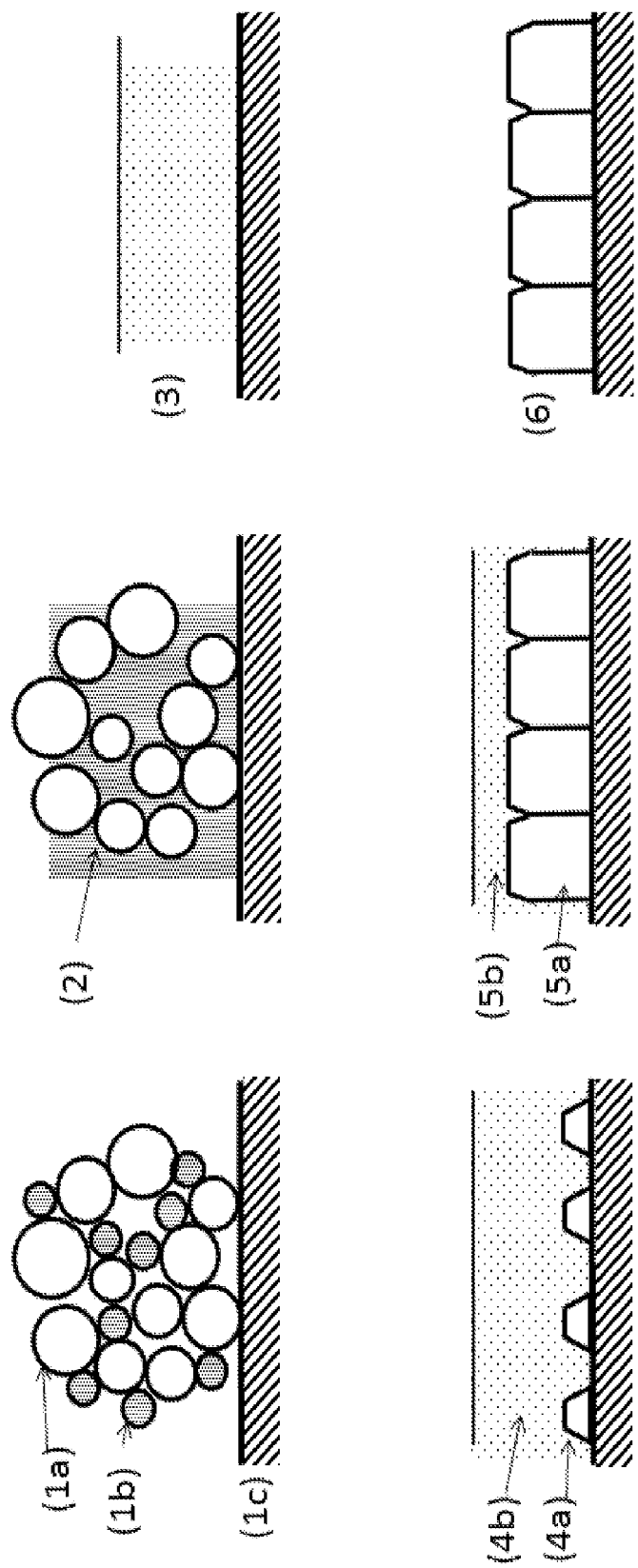
FIG. 1 is a simplified diagram illustrating a process for flux growth of a thin film electrolyte ceramic according to embodiments of the present invention.

The present invention is directed to battery technologies and processing techniques thereof. In various embodiments, a ceramic electrolyte powder material (or components thereof) is mixed with one or more flux materials to form a fluxed powder material. The fluxed powder material is shaped and heated at a temperature less than 1000° C. to form a dense lithium conducting material. There are other variations and embodiments as well.

As explained above, existing batteries and manufacturing processes thereof are inadequate for current uses. Batteries with liquid electrolytes have the problem of forming SEI layers that limit cycle life. In addition, they do not allow safe usage of Li metal anodes, thereby reducing energy density. In addition, batteries with liquid electrolytes are hazardous, as they are a hydrocarbon that can burn.

Similarly, batteries with polymer electrolytes have many disadvantages as well. Polymer electrolytes form SEI layers, which limit cycle life. In additional, they cannot be reliably deposited at less than 50 μm thickness, which translate to low energy density. Also, batteries with polymer electrolytes do not have sufficient $Li^+$ conductivity at <60° C.

LiPON type of batteries similarly has is disadvantages. Among other things, LiPON type of batteries is characterized by low Li+ conductivity at reasonable temperatures. In addition, during the manufacturing process, the electrolyte material is typically deposited by expensive PVD processes.

Various types of solid electrolytes have their respective disadvantages. For example, sulfide solid electrolytes are unstable to air, water, and/or Li anodes. Also, sulfide solid electrolytes typically cannot be deposited as thin films. Many oxide solid electrolytes, on the other hand, have low $Li^+$ conductivity at reasonable temperatures, rendering them unsuitable. The Lithium Garnet materials are a notable exception.

It is therefore to be appreciated that embodiments of the present invention provide advantages over existing materials and manufacturing processes thereof. As explained above, lithium ion batteries are very useful in many applications. Solid state lithium conducting ceramic materials are of immense technological importance for the development of all solid state lithium ion batteries. In various applications, a conducting ceramic forms the electrolyte component in the battery. For example, the conducting ceramic separates the positive and negative electrodes (i.e., the cathode and the anode). The electrolyte needs to (1) provide a medium for fast transport of lithium ions, and (2) prevent any electronic flow between the electrodes, as an electronic flow between the electrodes can short-circuit the battery and cause self-discharge. When assembled in the solid state battery, the ceramic electrolyte needs to have sufficiently low ionic resistance that it does not present a limiting factor to high current flow. The ionic resistance value is inversely proportional to both the ionic conductivity and the thickness of the electrolyte layer. It is therefore desirable for the ceramic electrolyte to (1) have high conductivity, and (2) be capable of being fabricated in a thin-film geometry. Currently, there are no known solid Li ion conductors with conductivity >1e-5 S/cm that can be deposited at scale in thin film form. The ability to do so would allow for safe use of lithium metal anodes, which make for batteries with higher energy density.

Lithium conductive electrolytes often have low conductivity or low stability. Lithium garnets are known to have relatively good chemical, thermal, and electrochemical stability; when doped to retain the cubic phase at low temperature, garnets may have high conductivity. Compositions similar to $Li_7La_3Zr_2O_{12}$ and doped compositions such as $Li_{7-x}La_3Zr_{2-x}M_xO_{12}$, where M can be Nb or Ta, or $Li_{7-x}Al_yLa_{3-y}Zr_2O_{12}$ have high conductivity. However, methods for depositing garnet as thin films are generally unavailable, which limits garnets' practical use. Lithium conducting ceramic materials that can be used as electrolytes in solid state batteries include materials from the garnet family, perovskites, and tungsten bronzes. For example, garnet-type $Li_5LaNb_2O_{12}$ typically has a lithium-ion conductivity of about $10^{-5}$ $Scm^{-1}$. Similar lithium conducting ceramic materials include those with the NASICON structure and the LISICON structure. It is to be appreciated that embodiments of the present invention disclose a method of depositing a thin film of lithium conducting garnet $Li_A La_B M'_C M''_D Zr_E O_F$, where $4<A<8.5$, $1.5<B<4$, $0<C<2$, $0<D<2$, $0<E<2$, $10<F<14$ and M' is selected from Al, Mo, W, Nb, Sb, Ca, Ba, Sr, Ce, Hf, Rb, and Ta, and M" is selected from Al, Mo, W, Nb, Sb, Ca, Ba, Sr, Ce, Hf, Rb, and Ta. Other compositions such as $Li_A La_B M'_C M''_D Ta_E O_F$, $Li_A La_B M'_C M''_D Nb_E O_F$ are included as well.

A common feature of lithium conducting ceramic materials is that they are traditionally prepared by solid state reaction processes, where the crystalline structure is synthesized by mixing the components in the form of oxides, carbonates, nitrates, acetates, hydroxides or other inorganic salts followed by repeated calcination at a high reaction temperatures typically greater than 800° C. and for a period of time (e.g., typically >6 hours). The high temperature process is needed to form the correct crystalline phase, and it is often difficult to form desired crystalline structure using solid state reaction method. In addition, the repeated solid state reactions are often too expensive and inefficient for commercialization of the product. Furthermore, in the case of Garnets the calcined product usually requires even higher temperatures (>1000° C.) for long times (>20 hrs) for the purposes of sintering (i.e., to heat the powdered material so that it forms a dense polycrystalline ceramic). The requirement of such high processing temperatures to achieve the required phase and to form it into a dense structure presents significant complications for integrating such materials into a thin film battery design where the electrolyte may need to be co-processed with the other elements of the battery (e.g., current collectors, anode and cathode).

Various embodiments of the present invention provide a techniques which in one step achieve both (1) the synthesis of the correct phase and (2) forming it into a thin film geometry. It is to be appreciated that the techniques and processes according to embodiments of the present invention significantly reduce processing temperatures compared to conventional techniques.

FIG. 1 is a simplified diagram illustrating a process for flux growth of a thin film electrolyte ceramic according to embodiments of the present invention. This diagram is merely an example, which should not unduly limit the scope of the claims. One of ordinary skill in the art would recognize many variations, alternatives, and modifications. To prepare a flux-grown lithium conducting thin film electrolyte, a slurry is first prepared. For example, the slurry comprises a mixture of electrolyte and flux powders. Depending on the application, the electrolyte powders are typically powdered oxides, carbonates, nitrates, sulfates and/or other inorganic salts of the principal electrolyte elements. In a specific embodiment, the electrolyte comprises a garnet material with the formula $Li_7$ $_xLa_3Z_{2-x}M_xO_{12}$, and the viable powdered oxide components comprise LiOH, $La_2O_3$, and $ZrO_2$. Depending on the material, the electrolyte powder material can have a median particle size of about 100 nm to 10 um. In a specific embodiment, the electrolyte powder material is characterized by a median particle size of about 100 nm to 2 um.

The additional powders of the flux component(s), which comprises inorganic salts of lithium (or other alkali metals), are added to the electrolyte powders. Depending on the application, such salts may include LiOH, $Li_2CO_3$, $Li_3BO_3$, LiCl, LiBr, and/or LiI. Flux material can be alkali metal hydroxides, chlorides, nitrates, sulphates, and/or others. In various embodiments, the flux comprises two types of flux powders. For example, the first flux material comprises one or more materials selected from LiOH, LiCl, LiBr, $LiNO_3$, and $LiSO_4$, and the second flux material comprises one or more materials selected from NaOH, NaCl, $NaNO_3$, $NaSO_4$, NaBr, and $Na_2CO_3$. In various embodiments, three or more different types of flux materials are used. For example, a third flux material comprising KOH, KCl, $KNO_3$, $KSO_4$, KBr, and/or $K_2CO$ can be used.

Typically, individual flux materials are characterized by a melting point of about 700° C. By mixing two flux materials which posses a Eutectic melting point, a lower melting temperature can be achieved, and the Eutectic temperature can be about 200~400° C. For example, two flux powders can be used together to form a Eutectic solvent mixture:

0.3LiOH-0.7NaOH (m.p.=251° C.)

0.29LiOH-0.71KOH (m.p.=227° C.)

The electrolyte components and flux powders are mixed together. In the flux growth method the flux makes up the majority of the volume. The ratio of flux powder to electrolyte powders can be about 2:1, 3:1, 6:1, or other ratios. It is to be appreciated that electrolyte powders and flux powers can be mixed using various types of processes, such as ball milling in an inert liquid, which can be ethanol, isopropanol, toluene, and/or others.

Subsequently, the mixture of electrolyte and flux powders is cast onto a carrier substrate. For example, for the purposes of making a solid state battery, the substrate can be used to serve as the anode current collector of an assembled battery. It is to be appreciated that for this application, a thin conductive material is used. In various embodiments, the carrier substrate comprises a copper, nickel, or stainless steel foil of <25 um thickness. In certain embodiments, the carrier substrate comprises polymer material with nickel and/or copper coating. The substrate can be other materials, such as nickel, as well.

As shown in FIG. 1, electrolyte powders (1a) is mixed with flux powders (1b) and provided on the carrier substrate (1c).

In various embodiments, the flux materials are chosen to have low melting points. Additionally, flux material may include multiple flux components, which together form eutectic mixtures that exhibit even lower melting point than the components by themselves. The flux material is heated up to a temperature higher than its melting point, and under this temperature it forms a liquid phase. In its liquid phase, the flux fills the space between the powders of the ceramic electrolyte as illustrated in (2) of FIG. 1.

The components of the ceramic electrolyte are soluble in the liquid flux, and therefore dissolves in the liquid flux. For example, the dissolved ceramic electrolyte powers can form, with the liquid flux material, a completely molten layer on the substrate as illustrated in (3) of FIG. 1.

As shown in (4) of FIG. 1, the nucleation process of the desired electrolyte phases occurs. In an embodiment, the nucleation process can be initiated by gently cooling the system.

Under the nucleation process, the crystallites of electrolyte continues to grow and coalesce, thereby forming a continuous layer on the substrate. Also during this process, the excess molten flux (5b) is pushed out from the space the dense and shaped electrolyte material (5a). As shown in (5) of FIG. 1, molten flux (5b) overlays the formed electrolyte material (5a), and during this process, the electrolyte material is densified, as the space that previously existed among the electrolyte powder particles is removed.

As explained above, flux material is used to facilitate the formation of dense and shaped electrolyte material, and therefore the flux material is to be removed. When sufficient film growth has been achieved, the system is quenched to room temperature and the excess flux is washed away using a solvent. For example, the solvent may comprise water, ethanol, isopropanol, acetone, and/or acetonitrile. The solvent removes the flux material without removing the shaped electrolyte material. Depending on the application, the solvent can be $H_2O$, ethanol, acetone, and/or other types of material. The flux may be chemically etched by acids such as HCl, or bases such as $NH_4OH$, or other types of etchants. As shown in (6) of FIG. 1, after removing the flux material, a continuous dense polycrystalline ceramic layer remains on the carrier substrate. The thickness of the ceramic layer is between about 100 nm and 100 um and more preferably 1-10 um. The performance of the ceramic electrolyte is as good as (or better) than bulk ceramic material prepared by conventional methods. An advantage of the present growth method is that it may generate a structure with few grain boundaries in the plane of the film which would otherwise cause a reduction in the total conductivity.

It is to be appreciated that depending on the application, one or more steps described above can be added, removed, replaced, modified, rearranged, and/or overlapped, which should not limit the scope of the claims.

Figure 2:
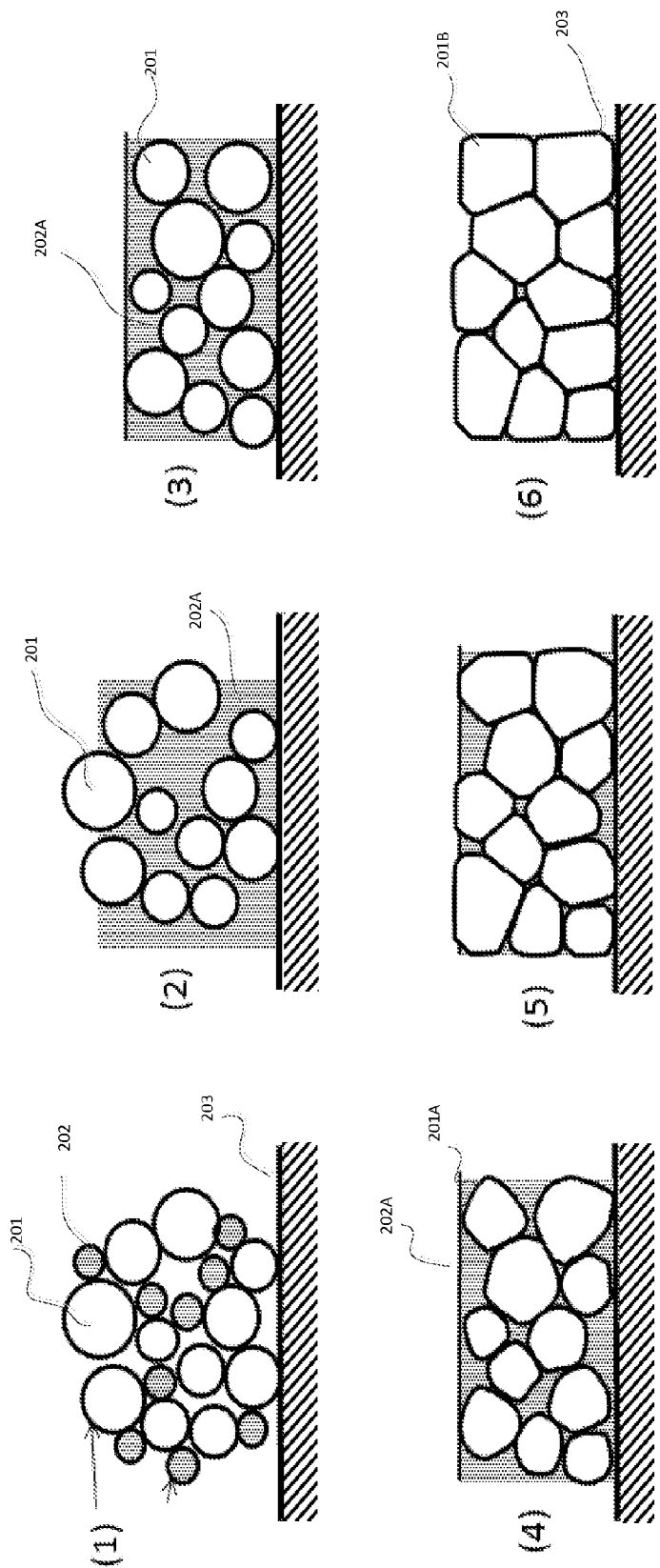
FIG. 2 is a simplified diagram illustrating a process of flux sintering of ceramic electrolyte thin film according to embodiments of the present invention.

FIG. 2 is a simplified diagram illustrating a process of flux sintering of ceramic electrolyte thin film according to embodiments of the present invention. This diagram is merely an example, which should not unduly limit the scope of the claims. One of ordinary skill in the art would recognize many variations, alternatives, and modifications.

It is to be appreciated that depending on the processes and materials, film growth from a completely molten phase may result in uneven microstructures due to abnormal grain growth, where preferential crystallite grows along favorable crystallographic directions or nucleation of secondary phases. Therefore, for certain situations, it is desirable to use pre-synthesized electrolyte powders in the slurry in place of the raw components. Depending on the application, the electrolyte component powders are typically powdered oxides, carbonates, nitrates, sulfates and/or other inorganic salts of the principal electrolyte elements. In a specific embodiment, the electrolyte comprises a garnet material with the formula $Li_4La_BM'_CM''_DZr_EO_F$, and the viable powdered oxide components comprise $Li_2CO_3$, $La_2O_3$, and $ZrO_2$. In various embodiments, pre-synthesized electrolyte ceramic powders are prepared by conventional high temperature reaction between the components followed by milling to reduce particle size to around 1 micron. For example, 100 gms of pre-synthesized $Li_7La_3Zr_2O_{12}$ electrolyte powder can be prepared by mixing 31.03 gms of $Li_2CO_3$, 58.65 of $La_2O_3$, and 29.57 gms of $ZrO_2$ by ball milling in isopropanol for 24 hrs. The dried mixture is then calcined at 900° C. for 12 hrs, and then 1100° C. for 12 hrs to form the garnet phase. The calcined powder is then re-milled in isopropanol to reduce the average particle size to 1 um.

The synthesized electrolyte powder material is mixed with the flux components and mixed with an appropriate liquid to form a slurry for film casting, which is similar to the process illustrated in FIG. 1. The slurry is cast onto a substrate to form a film of thickness between 200 nm-100 um. As described above, the substrate can be a metal conductive material. As shown in (1) of FIG. 2, pre-synthesized electrolyte powder 201 is mixed with flux material 202, and the mixture of the two are provided on the substrate 203. The flux material 202 is characterized by a much small powder size compared to the pre-synthesized electrolyte powder material 201, thereby allowing the flux material 202 to fill into the space between the pre-synthesized electrolyte powder material 201.

The dried slurry is heated to initiate melting of the flux components. For example the mixture can be heated at a rate of 1° C./min to a temperature of 400° C. and held at this temperature for 6 hrs. In various embodiments, the flux material 202 is provided at a lower volume fraction relative to the pre-synthesized electrolyte powder material 201. As a result of the smaller volume fraction of the flux at the melting temperature of flux components, the molten flux material 202 cannot completely dissolve the pre-synthesized electrolyte powder material 201.

As shown in (2) of FIG. 2, the liquid flux 202A (formed by the melted flux material 202) initially wets the particles of the pre-synthesized electrolyte powder material 201 and filling into the space among these particles. As shown in (3) of FIG. 2, the viscous forces cause rearrangement of the pre-synthesized electrolyte powder material, which results in increased packing efficiency and densification. For example, the densification can result in a reduction in volume of as much as 5-20%.

With the help of viscous forces, liquid phase sintering occurs, where the ceramic electrolyte particles are dissolved at high energy contact points and re-precipitated at lower energy vertices, thereby resulting in further densification and coarsening of the ceramic microstructure as shown in (4)-(6) of FIG. 2. As shown in (4) of FIG. 2, electrolyte material 201A is being reshaped. The electrolyte material forms a polycrystalline film 201B deposited on the substrate 203, as shown in (6) of FIG. 2. Excess flux material is expelled to the surface of the film 201B. Depending on the application, the excess flux material can be removed in many ways. For example, the excess flux material is washed away. In certain embodiments, certain amount of flux material is trapped at triple points within the ceramic structure, where it has minimal and/or insignificant effect on the transport properties of the electrolyte 201B.

Figure 3:
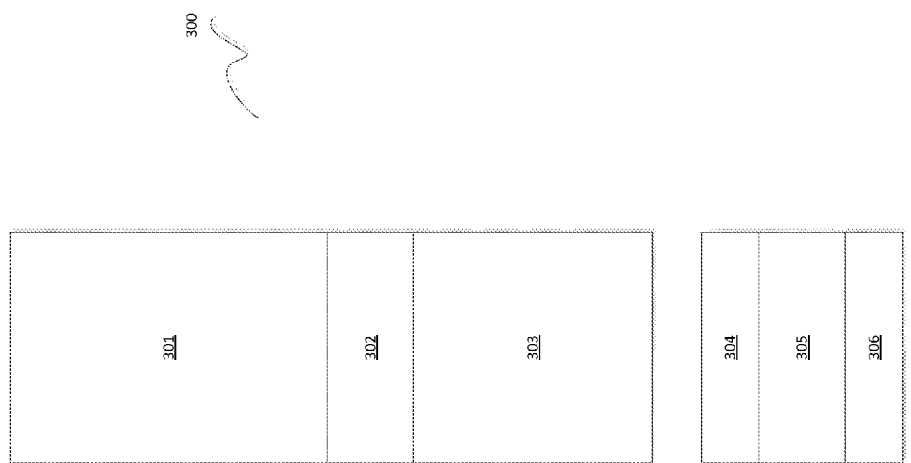
FIG. 3 is a simplified diagram illustrating a two-component battery structure utilizing the solid electrolyte and substrate manufactured using processes according to embodiments of the present invention.

FIG. 3 is a simplified diagram illustrating a two-component battery structure utilizing the solid electrolyte and substrate manufactured using processes according to embodiments of the present invention. This diagram is merely an example, which should not unduly limit the scope of the claims. One of ordinary skill in the art would recognize many variations, alternatives, and modifications. In FIG. 3, a battery cell 300 has a two-component architecture. Cathode particle elements 301 and 303 are coated on both sides of a cathode current collector 302. For example the cathode material may comprise a mixture of an active cathode material $LiFePO_4$ and conductive additive materials such as carbon black for electronic conductivity and presynthesized $Li_7La_3Zr_2O_{12}$ material for ionic conductivity. The thickness of the cathode layers 301 and 303 are between 1 um and 1000 um, preferably 100 um. The thickness of the cathode current collector element, 302 is preferably less than 20 um. Anode current collector 305 is coated on both sides by electrolyte elements 304 and 306.

In an embodiment, the garnet precursor material, the flux material, and optionally a solvent, dispersant, and/or binder may be coated onto a substrate such as a nickel, copper, or stainless steel foil. The coating can be done by screen printing, slot-die, gravure, microgravure, doctor blade, knife-over-roll, comma coating, reverse comma coating, and/or other techniques. The coating may be done on one or both sides of the substrate. The coating is dried, calendered, and sintered to produce a dense garnet film on one or both sides of the substrate. This component may be married with a cathode to produce a battery.

Figure 4:
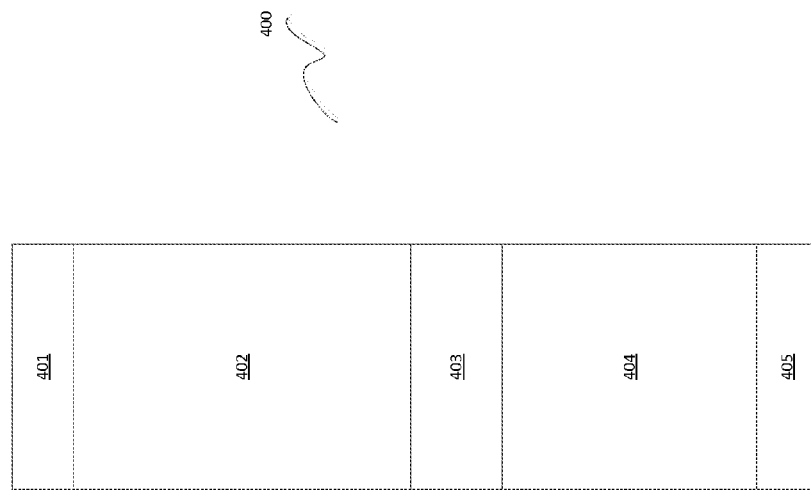
FIG. 4 is a simplified diagram illustrating a one-component battery structure utilizing the solid electrolyte and substrate manufactured using processes according to embodiments of the present invention.

FIG. 4 is a simplified diagram illustrating a one-component battery structure utilizing the solid electrolyte and substrate manufactured using processes according to embodiments of the present invention. This diagram is merely an example, which should not unduly limit the scope of the claims. One of ordinary skill in the art would recognize many variations, alternatives, and modifications. In FIG. 4, the cathode current collector 403 is positioned between cathode particle elements 402 and 404. The cathode element 402 interfaces with the electrolyte 401. The cathode element 404 interfaces with the electrolyte 405.

Figure 5:
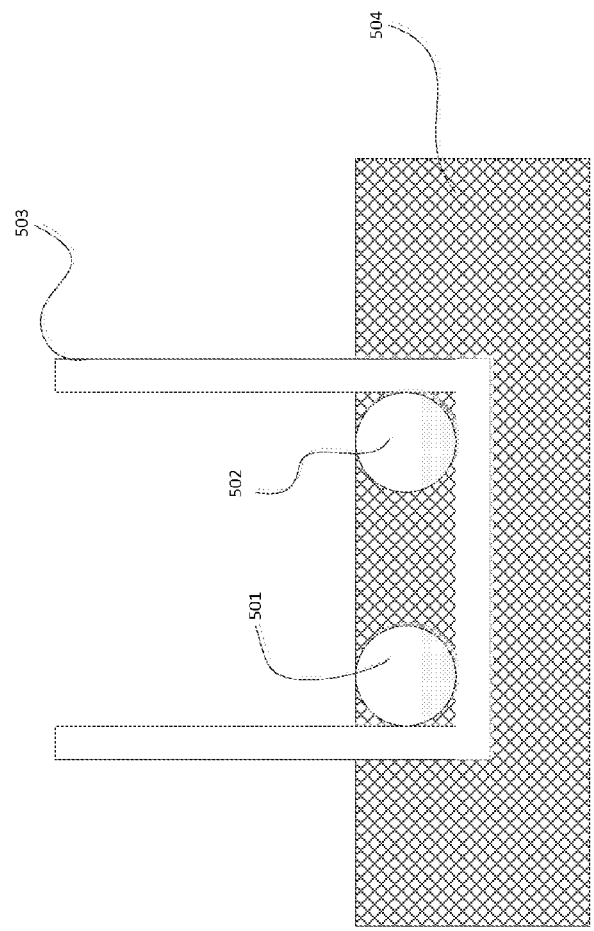
FIG. 5 is a simplified diagram illustrating a process of depositing mixed flux and powder material onto a sheet of substrate according to an embodiment of the invention.

In addition to directly depositing electrolyte powder material and flux material onto a conductive surface, the mixed flux and electrolyte powder material can also be deposited onto surfaces of substrates after mixing. FIG. 5 is a simplified diagram illustrating a process of depositing mixed flux and powder material onto a sheet of substrate according to an embodiment of the invention. This diagram is merely an example, which should not unduly limit the scope of the claims. One of ordinary skill in the art would recognize many variations, alternatives, and modifications. As shown in FIG. 5, a molten mixture 504 is provided. The molten mixture 504 comprises one or more flux material and the electrolyte powder material in molten state. A substrate 503 is s sheet of substrate material. For example, the substrate 503 is a sheet of conductive current collector material that is transported into the molten mixture by rollers 501 and 502, which parts of a transport system. The portion of the substrate 503 submerged in the molten mixture 504 is coated with the molten mixture. Once cooled and formed, the flux portion of the molten mixture 504 is removed from the surface of the substrate 503, thereby leaving a layer of electrolyte material on the substrate surface. It is to be appreciated that this process of transporting a large sheet of substrate allows fast manufacturing of battery subcomponents and is compatible with existing manufacturing processes and tools thereof.

Figure 6:
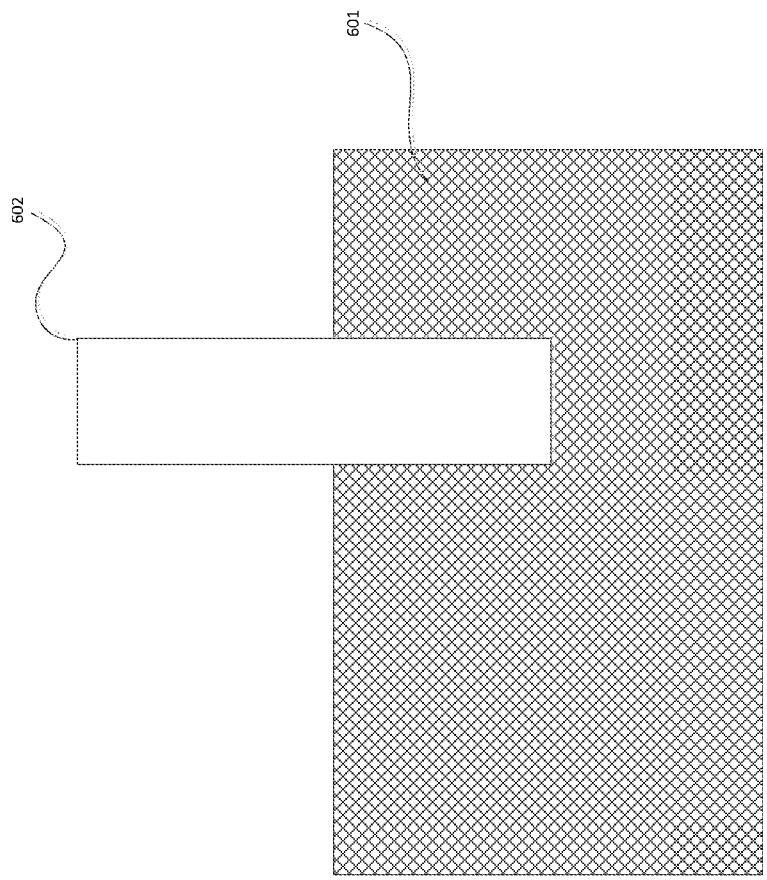
FIG. 6 is a simplified diagram illustrating a process of dipping a substrate into a mixed flux and powder material according to an embodiment of the invention.

FIG. 6 is a simplified diagram illustrating a process of dipping a substrate into a mixed flux and powder material according to an embodiment of the invention. This diagram is merely an example, which should not unduly limit the scope of the claims. One of ordinary skill in the art would recognize many variations, alternatives, and modifications. As shown in FIG. 6, a molten mixture 601 is provided. The molten mixture 601 comprises one or more flux material and the electrolyte powder material in molten state. A substrate 602 is s sheet of substrate material. Flux and electrolyte powder materials are deposited onto the substrate 602 when the substrate 602 is dipped into the molten mixture 601. For example, since both sides of the substrate 602 are dipped into the molten mixture 601, the molten mixture 601 is deposited on both sides of the substrate 602. Once the molten material is cooled, the flux material can be removed, leaving a layer of electrolyte powder material deposited on the substrate.

Figure 7:
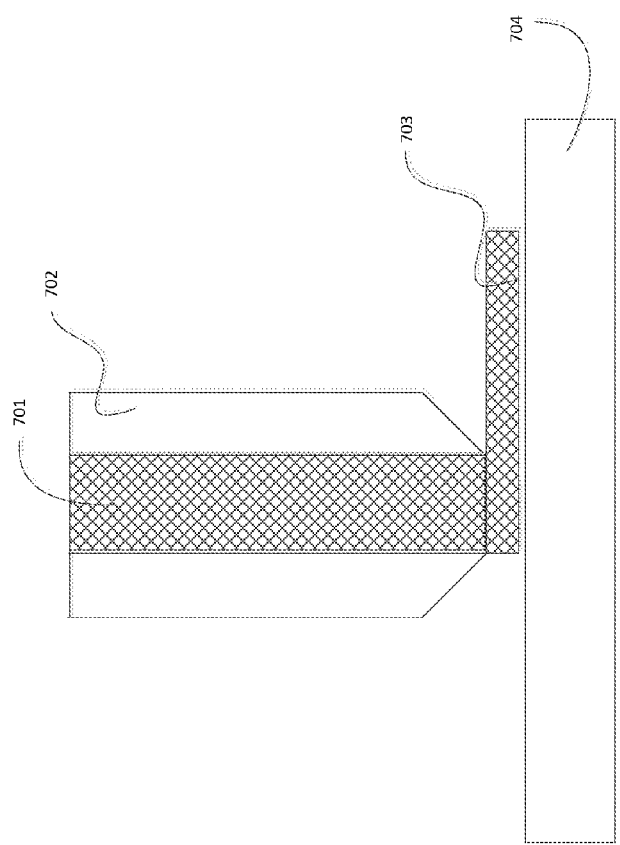
FIG. 7 is a simplified diagram illustrating a slot casting process for depositing electrolyte mixture material on a substrate according to an embodiment of the present invention.

FIG. 7 is a simplified diagram illustrating a slot casting process for depositing electrolyte mixture material on a substrate according to an embodiment of the present invention. This diagram is merely an example, which should not unduly limit the scope of the claims. One of ordinary skill in the art would recognize many variations, alternatives, and modifications. As shown in FIG. 7, an electrolyte mixture 701 is provided within the cavity of a slot-casting apparatus 702. The electrolyte mixture 701 comprises dense electrolyte material and optionally includes a polymer material. The dense electrolyte material is formed by mixing electrolyte powder material with flux material, and later removing the flux material to have dense electrolyte material in crystallite form. The polymer material is mixed with the dense electrolyte material to provide structure support and improved density. For example, the polymer material can be PVDF, PVDF-HFP, PAN, PEO, and/or other types of stable polymer material. In various embodiments, the polymer material is stable at about 0~4.5V versus lithium. Through the slot-casting apparatus 702, an electrolyte mixture layer 703 is deposited on the substrate 704. For example, the substrate 704 is a current collector element of a battery. It is to be appreciated that by using the slot-casting process, it is possible to deposit the electrolyte mixture material onto a large sheet of substrate, which can later be partitioned to form current collector elements of batteries.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A method for making a material, the method comprising:
providing a lithium-ion conducting ceramic powder material at a first quantity, the lithium-ion conducting ceramic powder material being characterized by a first density, the lithium-ion conducting ceramic powder material being characterized by a median particle size of about 100 nm to 10 μm;
providing a first flux material at a second quantity, the second quantity being less than 51% of the first quantity, the first flux material comprising lithium-ion ceramic powder material, the first flux material being characterized by a melting temperature of about 500-1000° C.;
providing a second flux material at a third quantity, the second flux material being characterized by a melting temperature of about 500-1000° C.;
mixing at least the first flux material and the second flux material to form a eutectic mixture, the eutectic mixture being characterized by a melting point of less than 800° C.;
subjecting the eutectic mixture to a temperature of about 100 to 1100° C.;
mixing the eutectic mixture with the lithium-ion conducting ceramic powder material to form a fluxed ceramic powder material;
shaping the fluxed ceramic powder material into a predetermine shape;
heating the shaped fluxed ceramic powder material to a temperature of less than 1100° C.; and
forming a dense lithium-ion conducting material, the dense lithium-ion conducting material being characterized by a second density, the second density is at least 20% higher than the first density; wherein the lithium-ion conducting ceramic powder material comprises electrolyte component powders selected from one or more of metal oxides, nitrates, carbonates, sulfates, borates, or hydroxides; and wherein the electrolyte component powders is characterized by a quantity less than the second quantity.

2. The method of claim 1 wherein the first flux material comprises inorganic salts of lithium-ion conducting material.

3. The method of claim 1 wherein the second density is at least 40% higher than the first density.

4. The method of claim 1 further comprising melting the lithium-ion conducting ceramic powder material by the eutectic mixture at a temperature of less than 800° C.

5. The method of claim 1 further comprising dissolving the lithium-ion conducting ceramic powder material by the eutectic mixture at a temperature of less than 800° C.

6. The method of claim 1 wherein the eutectic material comprises less than 80% of a total mass of the fluxed ceramic powder material.

7. The method of claim 1 wherein the predetermined shape is disc, sheet, cylinder, or pellet.

8. The method of claim 1 wherein the second quantity being about 15~30% of the first quantity.

9. The method of claim 1 wherein the first flux material comprises one or more materials selected from LiOH, LiCl, LiBr, LiNO$_3$, Li$_3$BO$_3$ or LiSO$_4$.

10. The method of claim 1 wherein the second flux material comprises one or more materials selected from NaOH, NaCl, NaNO$_3$, NaSO$_4$, NaBr, or Na$_2$CO$_3$.

11. The method of claim 1 wherein the eutectic mixture is characterized by a melting point of about 200 to 800° C.

12. The method of claim 1 further comprising subjecting the flux material to a temperature of about 200 to 1000° C.

13. The method of claim 1 wherein the lithium-ion conducting ceramic powder material being characterized by a median particle size of about 100 nm to 2 um.

14. The method of claim 1 wherein the lithium-ion conducting ceramic powder material comprises a garnet material.

15. The method of claim 1 wherein the lithium-ion conducting ceramic powder material comprises a perovskite material.

16. The method of claim 1 wherein the lithium-ion conducting ceramic powder material comprises Nasicon material, Lisicon material, and/or a Tungsten Bronze material.

17. The method of claim 1 further comprising providing a third flux material at a third quantity, the third flux material comprising KOH, KCl, KNO$_3$, KSO$_4$, KBr, and/or K$_2$CO.

18. The method of claim 1 further comprising removing the first flux material and the second flux material by subjecting the dense lithium-ion conducting material to one or more solvent washings, the one or more solvent comprising water, ethanol, isopropanol, acetone, acetonitrile, an acid, and/or a base.

19. The method of claim 1 wherein the dense lithium-ion conducting material is deposited on a metal conductive material.

20. The method of claim 1 further comprising:
providing a substrate material, the substrate material comprises a layer of metal conductive material, wherein the lithium-ion conducting ceramic powder material is provided on the layer of metal conductive material.

21. A method for depositing lithium garnet material, the method comprising:
providing components of lithium-ion conducting ceramic powder material at a first quantity, the components being characterized by a first density, the components being characterized by a median particle size of about 100 nm to 10 um;
providing a first flux material at a second quantity, the second quantity being more than 100% of the first quantity, the flux material comprising inorganic salts of lithium-ion conducting material, the first flux material being characterized by melting temperature of about 500-1000° C.;
provide a second flux material at a third quantity, the second flux material being characterized by melting temperature of about 500-1000° C.;
mixing the first flux material and the second flux material with the components to form the fluxed ceramic powder material;
shaping the fluxed ceramic powder material in to a predetermine shape;
heating the shaped fluxed ceramic powder material to a temperature of less than 1100° C.; and
forming a dense lithium-ion conducting material, the dense lithium-ion conducting material being characterized by a second density, the second density is at least 20% higher than the first density.

* * * * *